LINE GENERATOR FOR CRT DISPLAY SYSTEMS

Filed Sept. 8, 1971 3 Sheets-Sheet 1

INVENTORS.
JAMES R. BACON
GEORGE H. BARNES
JOHN C. SCHOTT
BY
Charles L. Hall

United States Patent Office 3,718,834
Patented Feb. 27, 1973

3,718,834

LINE GENERATOR FOR CRT DISPLAY SYSTEMS

James R. Bacon, Erdenheim, George H. Barnes, Philadelphia, and John C. Schott, Paoli, Pa., assignors to Burroughs Corporation, Detroit, Mich.

Filed Sept. 8, 1971, Ser. No. 178,620
Int. Cl. H01j *29/70*
U.S. Cl. 315—22 7 Claims

ABSTRACT OF THE DISCLOSURE

A vector generator for CRT display systems that limits the display length of vectors to a predeterminable maximum length and permits display of vectors having lengths less than the predetermined maximum length at a constant display intensity. Digital logic words representative of the components of the vector to be generated are converted into analog signals which are integrated to form ramp signals for driving deflection coils in a CRT. A control circuit, monitoring the analog signals, converts these signals to an approximation of the square root of the sum of the squares of the received signals. The result is summed with an adjustable voltage to establish an adjusted reference signal to the D/A converters for causing a vector of predetermined length to be displayed. An independent reference signal permitting vectors shorter than the predetermined maximum length to be displayed is constantly compared with the adjusted reference signal and is automatically substituted therefor when and as long as the magnitude of the adjusted signal, as derived from the input digital logic words to the D/A converters is greater than the magnitude of the independent reference signal.

BACKGROUND OF THE INVENTION

The present invention relates to vector generators for displaying strokes on the screen of a cathode ray tube (CRT) and more particularly pertains to a constant time vector generating system that will only cause the display of vectors having a predetermined maximum length and vectors having lengths less than the predetermined length.

Vector generators are used for generating strokes on a cathode ray tube (CRT) screen. A vector generator is actually a part of a larger display circuit which uses the strokes generated to form characters on the screen of the CRT. The technique used in prior art constant time vector generation comprises the development of DC signals that are proportional to the difference between initial and terminal X coordinates and initial and terminal Y coordinates of the vector to be displayed. These DC levels are integrated to obtain linear varying X and Y deflection currents, commonly known as ramp functions, to drive the deflection circuits of a CRT. The above technique has been found lacking in that it does not produce vector strokes that may be restricted in length, or have a constant display intensity.

The advantage to using a constant time vector generator with a computer control device is that the computer control device can operate with a synchronous system, usually its normal operating mode, thus eliminating problems that would be present if a variable time vector generating system were used. When vectors having a constant length are generated by a constant time system, the display intensity does not vary appreciably from vector to vector. The vectors must be restricted accurately, however. Also, there are times when it is desirable to generate a shorter length vector having the same intensity as the normally generated constant length vectors.

SUMMARY OF THE INVENTION

It is, therefore, an object of this invention to provide a constant time vector generator that accurately limits the generation of vectors to a predetermined settable length.

Another object of this invention is to provide a vector generator that limits the generation of vectors to a predetermined settable length and permits the generation of vectors having lengths less than the predetermined length.

A further object of this invention is to provide a vector generator that accurately limits the generation of vectors to a predetermined length, permitting the generation of vectors having lengths less than the predetermined length, with vectors of all lengths being displayed at a relatively constant display intensity.

The foregoing objects and general purpose of the invention are accomplished in a constant time vector generator utilizing X and Y coordinate signal paths responsive to signals from respective D/A converters by continuously monitoring the signals from the converters, producing a resultant signal and summing the resultant signal with a constant voltage to produce an adjusted reference signal for the D/A converters for stabilizing the vector stroke to a predetermined length, constantly comparing the adjusted reference signal with an independent reference signal and automatically substituting the independent reference signal for the adjusted reference signal when, and as long as, the magnitude of the adjusted reference signal, as derived from input digital logic words to the D/A converters, is greater than the magnitude of the independent reference signal, thereby permitting display of vector strokes shorter than the predetermined length.

DESCRIPTION OF THE DRAWINGS

Other objects and many of the attendant advantages of this invention will be readily appreciated as the same becomes better understood by reference to the following detailed description when considered in connection with the accompanying drawings in which like reference numerals designate like parts throughout the figures thereof and wherein.

DESCRIPTION OF THE PREFERRED EMBODIMENT

Figure 1:
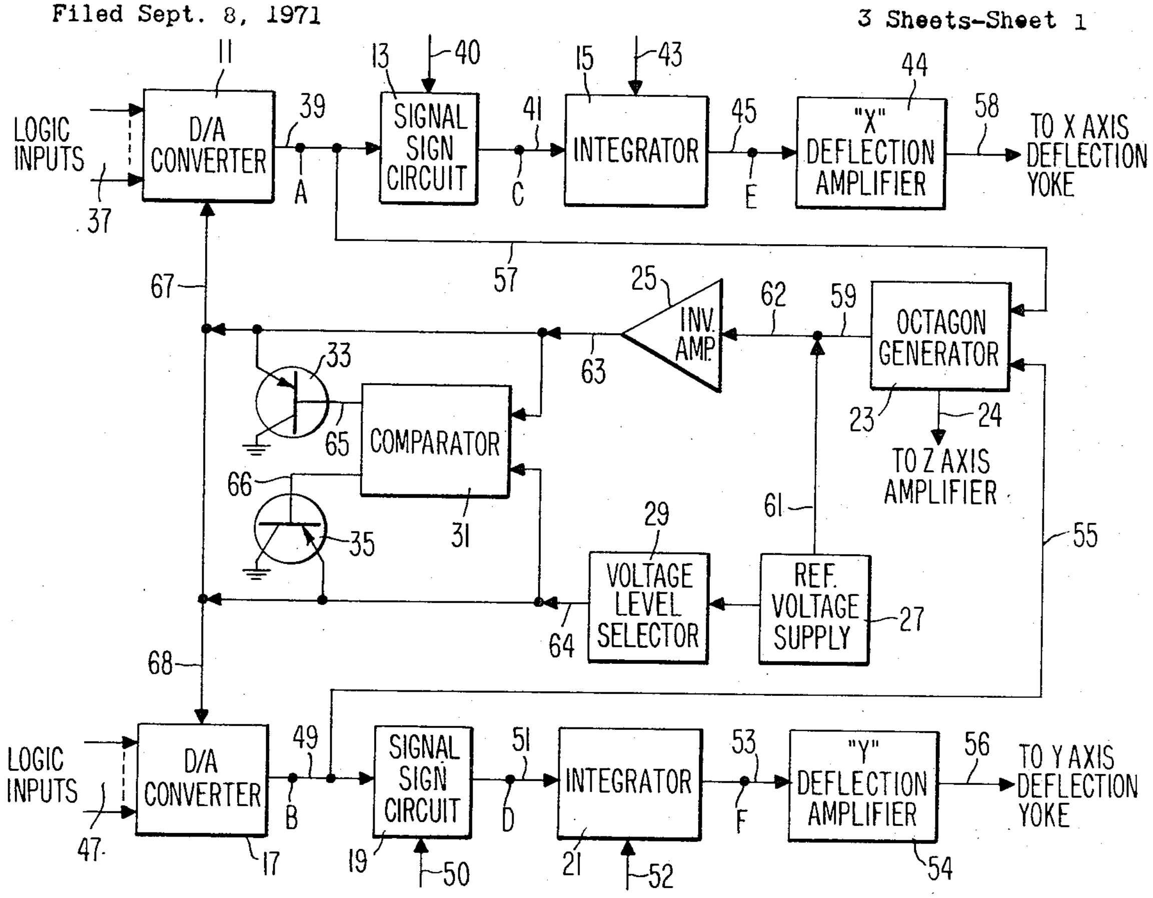
FIG. 1 is a block diagram representation of the preferred embodiment of this invention.

Referring first to FIG. 1 wherein the preferred embodiment of this invention is illustrated, digital-to-analog (D/A) converters 11, 17 receive respective "X" and "Y" axis digital logic data from inputs 37, 47, respectively, in a maner well-known, from computer apparatus not a part of this invention. The digital-to-analog converters 11, 17 are the well-known resistance ladder type which employ a DC reference voltage supplied over lines 67 and 68, respectively, to convert digital data to various amplitudes of voltage in response to the digital data received. In other words, the amplitude of the voltage signal at the outputs 39, 49 of the respective converters 11, 17 depends on the reference voltage inputs on lines 67, 68 and the digital data word fed into the converters on lines 37, 47. The digital data words determine what proportion of the reference input signals on lines 67, 68 is supplied to the output lines 39, 49 of the digital-to-analog converters.

There is one D/A converter for the X-axis deflection signal generating path and one D/A converter for the Y-axis deflection signal generating path. The X and Y deflection signal generating paths are identical in that they each have a signal sign circuit (13, 19), an integrator (15, 21) and a deflection amplifier (44, 54) connected in a series string, in the order named. The signal sign circuits 13, 19 operate on their input signals to give them either a positive or negative sign as determined by signals on sign change lines 40 and 50, respectively.

The integrators 15, 21 take the DC voltage signal at their inputs 41, 51, respectively, from the signal sign circuits and perform an integration, thereby generating a ramp function. These integrators are reset by discharge signals being applied at the integrator result lines 43, 52, respectively. The ramp function outputs of the integrators 15, 21 are amplified by respective X and Y deflection amplifiers 44, 54 and then applied to X and Y axes deflection yokes (not shown), thereby generating a vector for display on a cathode ray tube screen.

Figure 2:
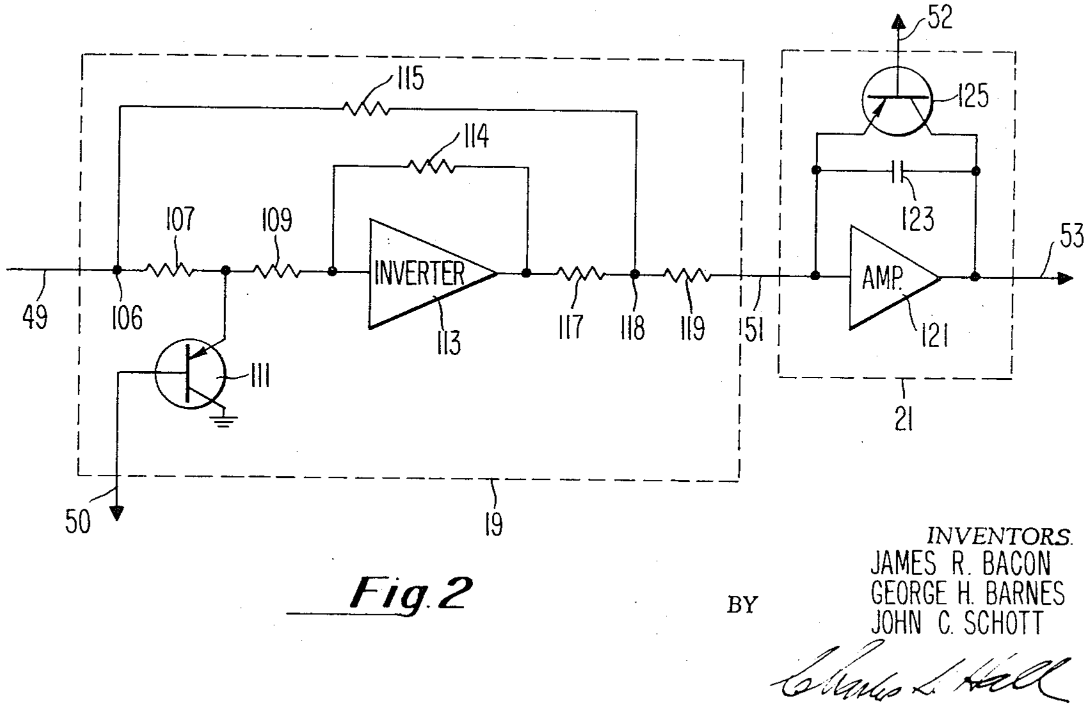
FIG. 2 is a schematic diagram of circuits utilizable in the signal sign circuits and the integrators of FIG. 1.

One type of signal sign circuit and integrator, for example, that may be utilized in the embodiment of FIG. 1 is depicted in FIG. 2. The "Y" signal sign circuit and integrator are chosen as examples for purposes of explanations. It should be understood that the explanation applies equally to the "X" axis signal sign circuit and integrator. The positive output signal from digital-to-analog converter 17 is received by signal circuit 19 over line 49. The signal on line 49 encounters junction point 106 connecting bypass resistor 115 into the circuit. Junction point 118 occurring between resistors 117 and 119 is the other end of bypass resistor 115. Resistors 107 and 109 are serially connected to the input of inverter amplifier 113 which has a feedback resistor 114. Transistor 111 is connected between resistors 107 and 109 at the input of inverter amplifier 113 and ground in a switch configuration so that a signal on the control line, 50, to one of its electrodes will cause transistor switch 111 to open or close. Resistors 117 and 119 are connected serially and, in turn, connect the output of inverter amplifier 113 to an integrator 21.

When transistor switch 111 is biased so that it is, in effect, a short circuit to ground, a major portion of the signal appearing on line 49, due to the relative sizes of resistors 107, 115 and 119, will be impressed on bypass resistor 115 and resistor 119 and supplied to integrator 21. If transistor switch 111 is biased so that it is open, however, a signal appearing on line 49 will not only be impressed on resistors 115 and 119 but will also be amplified by inverter amplifier 113. Amplifier 113 is adjusted so it will invert and double the amplitude of the signal at its input. The summation of the amplifier output and the voltage signal impressed across resistors 115 and 119 at point 118 will cause a negative signal substantially equal to the amplitude of the input signal, to be supplied to the integrator 21. The values of resistances and characteristics of the amplifier 113 and transistor switch 111 are chosen so that the amplitude of the signal leaving circuit 19 is substantially equal to the amplitude of the signal input to circuit 19, whether transistor switch 111 is on or off. It can thus be seen that when transistor switch 111 is biased to act as a short circuit to ground, circuit 19 will pass the signal at its input without changing its sign. But, when transistor switch 111 is biased open, circuit 19 will cause its output signal to be the negative of its input signal.

The output of the signal sign circuit 19 is supplied to the integrator 21, over lead 51, to be integrated and produce a ramp function at the integrator output 53. The integrator 21 utilizes a standard operational amplifier 121 having a capacitor 123 in a feedback loop. This capacitor, in turn, is shunted by transistor switch 125. The transistor switch is controlled by a digital signal, as is transistor switch 111, to open and close at the appropriate times. Prior to the start of the integration, transistor switch 125 will be closed. At the time the integration is to start, a signal will cause transistor switch 125 to open, thereby permitting capacitor 123 to charge and produce a ramp function. At the end of the integration, transistor switch 125 is again closed, thereby discharging the capacitor and, in effect, preparing integrator 121 for the next integration operation.

For reference purposes, the outputs of the D/A converter 11, the signal sign circuit 13 and the integrator 15 of the "X" deflection signal generating path have been designated A, C and E, respectively, and the outputs of the like components in the "Y" deflection signal generating path have been designated B, D and F, respectively.

The control circuit (FIG. 1) of this invention comprises a feedback circuit including octagon generator 23, inversion amplifier 25, and reference voltage supply 27; an independent reference signal source 29; and comparator circuit 31 with associated switches 33 and 35. The outputs 39 and 49 of the D/A converters are monitored and their reference signals modified in response thereto, by the feedback circuit, in the following manner.

Octagon generator 23 receives the D/A converter output signals from lines 39 and 49 over lines 57 and 55, respectively, and converts these signals into approximately the square root of the sum of the squares of these two signals. One example of a circuit to accomplish such approximation will be hereinafter explained. However, this should not be construed to mean that the invention is limited to the use of an octagon generator. A circle or rho generator, for example, may be used instead to derive a resultant signal as a function of the output of both the D/A converters. The output of the octagon generator is supplied, over line 24 to a Z-axis amplifier (not shown). The Z-axis amplifier takes this signal and utilizes it as an intensity control signal in a manner well-known in the art. The same output is summed with the output of a reference voltage source 27 of opposite polarity that will be more thoroughly explained hereinafter. The sum of these two signals is fed to an inversion amplifier 25.

The output of reference voltage supply 27, when adjusted by summing with the output of the octagon generator and inverted, is supplied to the D/A converters as reference signals. These reference signals stabilize the maximum length of the vector stroke indicated by the logic data input to the D/A converters. The type of digital-to-analog converters utilized, i.e., the resistance ladder type, produces a voltage output that is equal to the reference voltage level input multiplied by the decimal equivalent of the input binary data word divided by the full scale decimal value which the digital-to-analog converter is capable of producing. The length of a vector is proportional to the square root of the sum of the squares of the signals representative of its X and Y axis components. Reference voltage 27 has its output adjusted so that the sum of this reference voltage signal with the voltage length signal (output of the octagon generator) on line 59 produces a negative input on line 62 supplied to inversion amplifier 25, which, when amplified, inverted, and supplied to the D/A converters 11, 17 over lines 67 and 68, as a reference potential, causes the output of signals of the converters to represent the respective components of a certain length of vector.

Whenever the output of either digital-to-analog converter goes up, the output of octagon generator 23 will increase slightly and this increased voltage length signal summed with the reference voltage supply signal causes the inversion amplifier output on line 63 to drop, thereby decreasing the reference voltage input to the digital-to-analog converters. This decrease in the reference voltage input to the D/A converters causes the output of the converters to decrease proportionately. Likewise, when the output of a D/A converter goes down, indicating shorter vector strokes, the output of the octagon generator 23 will decrease, and the output of the inverter amplifier 25 will increase.

Thus, the feedback circuit as described, will tend to cause maintenance of a substantially constant voltage signal on output lines 39 and 49 of digital converters 11 and 17, respectively. The reference voltage of source 27 can, of course, be preset to increase or decrease the normal output level of the reference signal from the feedback circuit.

In order to generate signals that will trace vectors that are less than the length vector for which the feedback circuit is adjusted, this feedback circuit must be disengaged and another reference signal substituted. The independent reference signal source and the comparator circuit and its associated switches perform this function.

Voltage selector 29, which will be more explicitly explained hereafter, automatically supplies reference voltage signals to the D/A converters when vector strokes shorter than the length predetermined by the feedback circuit are required by the digital data input to the D/A converters. Voltage selector 29 is a source having multiple voltage levels which are selectively switchable into the D/A converter circuit for properly relating the length of shorter strokes to the maximum length stroke controlled by the feedback circuit. These voltage levels are chosen so that when they are supplied to the digital-to-analog converters as reference voltage signals they will cause the generation of vectors on the screen of a CRT having lengths that are related by multiples of a factor, such as two. What these voltage values should be can easily be determined by experimentation or by calculation using the relationship, the voltage output from the D/A converter is equal to the reference voltage multiplied by the decimal equivalent of a particular data input system divided by the full scale decimal value which the digital-to-analog converter is capable of producing.

Comparator amplifier 31 has as its inputs one of the voltage levels selectively switched into the circuit from the voltage level selector 29 on line 64 and the output of inverter amplifier 25 on line 63. If the signal on line 63 is larger than the signal supplied by the voltage level selector over line 64 (indicating a requirement for a short vector stroke), comparator amplifier 31 has an output on line 65 which biases transistor switch 33 to conduction thereby grounding the lead 63, from inverter 25 to the D/A converters 11, 17. At the same time, the output of comparator amplifier 31 on line 66 biases transistor 35 to an open state, thereby allowing the independent reference signal on line 64 to pass to the digital-to-analog converters 11 and 17 as their reference signal. When the output of inversion amplifier 25 on line 63 is less than the signal output from voltage level selector 29 on line 64, the output of comparator amplifier 31 is such that it biases transistor 35 to conduction, shorting the line 64 from voltage level selector 29 to D/A converters 11, 17 to ground and causing transistor 33 to open, thereby permitting the signal on the line 63, from inversion amplifier 25, in the feedback circuit, to be supplied to the digital-to-analog converters 11, 17.

Figure 3:
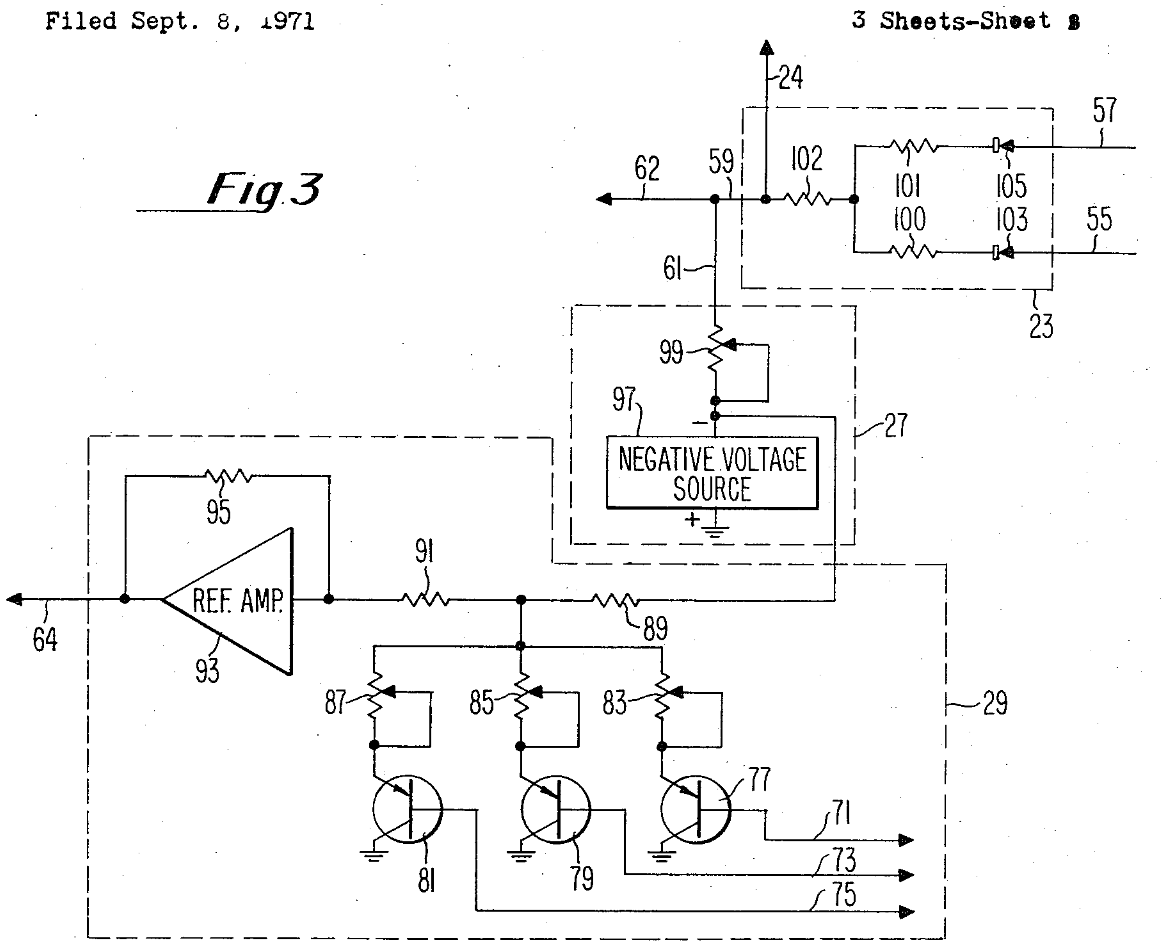
FIG. 3 is a schematic diagram of circuits utilizable in the reference voltage supply and the voltage level selector of FIG. 1.

FIG. 3 illustrates circuitry that may be used for octagon generator 23, reference voltage source 27, and voltage level selector 29.

Octagon generator 23 produces an approximation that approaches the square root of the sum of the squares of the signals presented to the input of the generator. This approximation is accomplished by circuitry comprising a pair of diodes 105, 103 and three resistors 101, 100, 102 interconnected so that there are two parallel legs connected together at one end, having a diode and a resistor in each leg with a resistor connected to the joined end of the two parallel legs. The diodes are oriented with their cathodes toward the resistors. The two unconnected ends 57, 55, respectively, of the two parallel legs 101, 105 and 100, 103 are inputs for the octagon generator 23. The resistor 102 connected to the joined ends of the two parallel legs acts as the output for the octagon generator 23.

The octagon generator 23 can be said to approximate the square root of the sum of the squares of the input signal because an octagon approximates a circle. The general equation of a vector, starting at origin, is $r^2=x^2+y^2$, where $r$ is the length of the vector and $x$ and $y$ are its components. Rotation of this vector about its origin will scribe a circle of radius $r$. This equation, then, also describes a circle whose radius is $$r=\sqrt{x^2+y^2}$$

hence, the nomenclature circle generator. Since a plot of all input voltages to circuit 23 that produce a certain constant value at the output is in the form of an octagon, the circuit is called an octagon generator.

In order for octagon generator 23 to function in this manner, the resistances 100, 101 in the two parallel legs must have equal resistance values. Diodes 105 and 103 may be standard diodes having similar characteristics. The value of the output resistor 102 is dependent on the amplitude of the voltage desired at the output, considering the range of voltages that will be applied to inputs 55 and 57 from the D/A converters. The resistance values of resistors 100 and 101 will determine the amplitude of the current flow in resistor 102. The voltage drop across resistor 102 is summed with the voltage output of reference voltage supply 27.

Voltage supply 27 may be merely a variable resistor 99 in series with a source of constant negative voltage 97, which may be a regulated DC power supply or some other equivalent. The voltage output signal of voltage supply 27 is chosen in reference to the voltage levels supplied by voltage reference selector 29. This voltage signal from voltage supply 27 must be larger than the voltage from selector 29.

Voltage level selector 29 may comprise a reference amplifier 93 with a feedback resistance 95 connected in series with a voltage divider comprising two resistors 91, 89 having three variable resistors 87, 85 and 83 serially connected to transistor switches 81, 79 and 77, respectively, in three parallel legs connected between the resistors 91, 89. These transistor switches may be biased "on" and conducting or "off" and not conducting. The resistance in the several legs may be varied, thereby increasing or decreasing the voltage drop in that leg and, in turn, the current supplied through resistor 91 to the reference amplifier. The output of the reference amplifier 93 is one of the inputs to the comparator 31. The control signals for biasing transistors 77, 79, 81 "off" or "on" may be derived from the same computer source that supplies the signal circuit and integrator command signals.

Which expansion mode the vector generator is operating in is determined by which transistor switch 77, 79, 81 is closed. Negative voltage source 27 may also supply a positive voltage drop across the legs of voltage level selector 29. By adjusting variable resistors 83, 85 and 87, signals varying in magnitude by a factor of 2 or other desired multiple may be produced. When these signals are supplied to the D/A converters as reference signals, the outputs of the D/A converters will have magnitudes that cause the display of vectors to be expanded by multiples of the factor of 2 or other desired multiple.

Assuming now that the voltage level selector is set to one of the four available expansion modes, for example, mode 4 out of the times 1, 2 ,4 and 8 modes, the operation of the embodiment of FIG. 1 will be explained with reference to the waveforms of FIG. 4 and the cathode ray tube display on the CRT screen illustrated by FIG. 5.

As a convenient starting point, let us further assume that the vector generator is starting at a time $T_0$ when no digital data logic words have been transmitted to the digital-to-analog converters 11, 17. At this time, $T_0$, the outputs 39, 49 of the digital-to-analog converters 11, 17, respectively, will be 0. Summing a 0 voltage from the octagon generator 23 with a negative voltage supplied by reference voltage supply 27 causes the entire negative reference voltage to be supplied to inversion amplifier 25 for amplification and inversion. The voltage output of amplifier 25, on line 63, will thus exceed the voltage on line 64. Comparator 31, upon sensing such a differential, will generate outputs that bias transistor switch 33 to an "on" state and transistor switch 35 to an "off" state, thereby supplying the voltage signal from voltage level selector 29 to the digital-to-analog converters as the reference voltage.

Assuming now, at $T_1$, that digital data words are received by both digial-to-analog converters 11, 17, the data words received will cause digital-to-analog converters 11 and 17 to generate a certain output. Assuming the waveforms in FIGS. 4A and 4B at time $T_1$ are generated, the waveforms in FIGS. 4A and 4B correspond to the waveforms that will be found at points A and B, the outputs of D/A converters 11 and 17, respectively, in the circuit of FIG. 1. At the moment the signals in time period $T_1$ are generated they are supplied to octagon generator 23. The output of octagon generator 23 is summed with a negative reference voltage supplied by reference voltage supply 27. This result is amplified, inverted and compared with the voltage output of voltage level selector 29 in comparator 31.

Let us assume that the output 63 of inversion amplifier 25, because of the magnitude of signals A and B generated by the D/A converters 11, 17, is less than the voltage supplied by voltage selector 29. Comparator amplifier 31 will respond to this difference by biasing transistor switch 33 off and transistor switch 35 on. This, in effect, places that portion of the feedback circuit consisting of octagon generator 23, inversion amplifier 25 and reference voltage supply 27, into the circuit. During the time that this portion of the feedback circuit is connected into the vector generator circuit, the reference voltages supplied to the D/A converters over leads 67 and 68 will vary in relation to their outputs A, B. This results in compensation for variations in the outputs of the digital-to-analog converters.

Taking the signal at points A and B and following them through the rest of the deflection circuit, we see that points C and D are at the output of signal sign circuits 13 and 19. Assuming that signal sign circuit 19 received a change of sign signal over sign change line 50, its output signal, as shown in time period $T_1$ in FIG. 4D, has changed its polarity. Assuming that signal sign circuit 13 had not received a sign change signal over its sign change line 40, the signal in time period $T_1$ in FIG. 4C will not change its polarity. The outputs, as shown in FIGS. 4C and 4D in time period $T_1$, are respectively supplied to the integrators 15, 21. These integrators generate a ramp function as shown in FIGS. 4E and 4F in relation to the received input waveforms. The ramp outputs of integrators 14 and 21 are shown in time period $T_1$ of FIGS. 4E and 4F. These outputs are supplied to their respective deflection circuits by way of the driving deflection amplifiers 44, 54.

Figure 5:
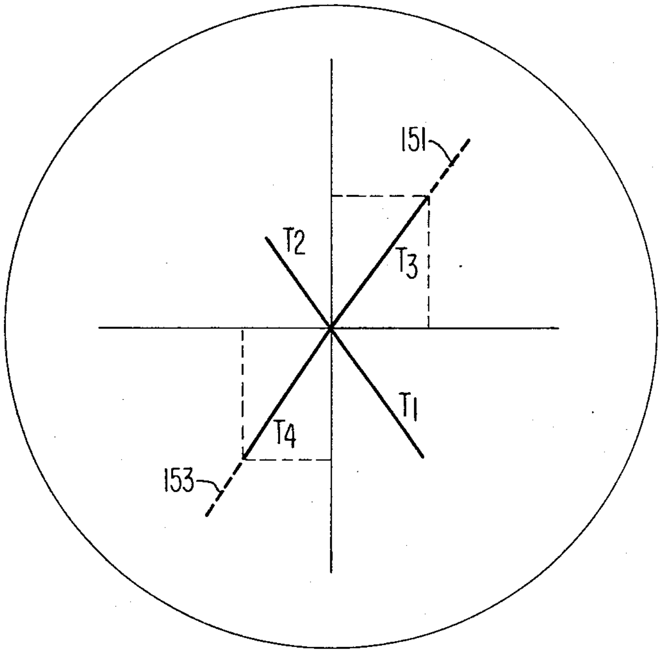
FIG. 5 is a representation of a CTR screen displaying vectors in response to the wave shapes of FIG. 4.

Placing the ramp functions in time period $T_1$ on CRT X axis and Y axis, deflection circuits will cause the display of the stroke $T_1$ on the CRT screen, shown in FIG. 5, in a manner that is well known to those skilled in the CRT display art.

Let us assume that digital data logic words are supplied to the digital-to-analog converters 11, 17 during time period $T_2$ that will cause the converters to generate a signal such as shown in FIGS. 4A and 4B, at time $T_2$. As can be seen, these two signals are smaller than the ones previously generated. If we assume that the signals generated by the digital-to-analog converters at time $T_1$ were representative of the maximum length vector to be generated, and the output of reference voltage supply 27 was set at a time when this value of signal was being generated by the D/A converters, then the signals during time $T_2$ are representative of some vector length less than the maximum length, for which reference voltage supply 27 is set. Octagon generator 23 responds to these signals and generates a voltage level that will be summed with the reference voltage supply 27. Since the signal supplied to octagon generator 23 is smaller, the result of the summation will be a larger negative voltage which will be amplified by inversion amplifier 25 and compared in comparator amplifier 31 with the voltage level supplied by voltage level selector 29.

Because reference voltage supply 27 and voltage level selector 29 were set up for the predetermined maximum length of the vector to be displayed, as explained above, whenever data words that represent a vector less than the predetermined maximum vector to be displayed are received, the voltage signal on line 63 will be greater than that on line 64 and comparator amplifier 31 will generate an output that biases transistor switch 33 on and biases transistor switch 35 off. This, in effect, supplies the voltage level selector voltage to the digital-to-analog converters as the D/A converter reference voltage instead of the voltage output of inversion amplifier 25. If comparator amplifier 31 had not performed this switching operation, disconnecting the feedback circuit at this time, the reference voltage supplied to digital-to-analog converters 11 and 17 would be increased, thereby causing digital-to-analog converters 11 and 17 to generate an increased output which would result in generation of a vector having the predetermined maximum length. Comparator amplifier 31, by disconnecting the feedback circuit, insures that vectors having lengths less than the maximum predetermind length vector will be accurately displayed on the CRT screen.

Tracing the converter signals through the rest of the deflection chain, we see that the outputs of the signal sign circuits 18 and 19, shown in FIGS. 4C and 4D in time $T_2$, indicate that the X signal sign circuit 13, as an example, received a change of sign signal over its sign change line 40. The outputs from the signal sign circuits are integrated by integrators 15 and 21. The outputs of the integrators are shown in FIGS. 4E and 4F at time $T_2$. These outputs are fed to the axis deflection circuits 44, 54 and cause the CRT tube to generate a shorter vector, shown as $T_2$ in FIG. 5. After the ramp functions have been generated, integrators 15 and 21 receive discharge signals over discharge signal lines 43 and 52 which ready the integrators for the next input signal, as was explained above.

Assume now, that during time period $T_3$, digital-to-analog converters 11 and 17 receive digital logic words that represent a vector having a length that is greater than the maximum length desired to be generated, the output of both digital-to-analog converters, when this condition is present, is shown in FIGS. 4A and 4B at time $T_3$. The initial level of this output is shown by dashed lines 127 and 131. Octagon generator 23 on reception of these, larger than usual, signals will generate a lower output. The octagon generator output will be summed with the output from the negative reference voltage supply and the result amplified and inverted. The output of amplifier 25 on lead 63, will, as a result of the larger octagon generator output, be smaller than the output from voltage level selector 29 on line 64. Consequently, comparator 31 feeds this lower voltage level over lines 67 and 68 to digital-to-anolog converters 11 and 17, respectively. This decreased reference signal will cause both digital-to-analog converter outputs to drop to a stable level, shown by solid lines in time $T_3$ of FIGS. 4A and 4B.

It must be remembered that the signal representations in FIGS. 4A and 4B are idealized for purposes of explanation; and the actual signal response will not be in the exact wave format shown.

Figure 4:
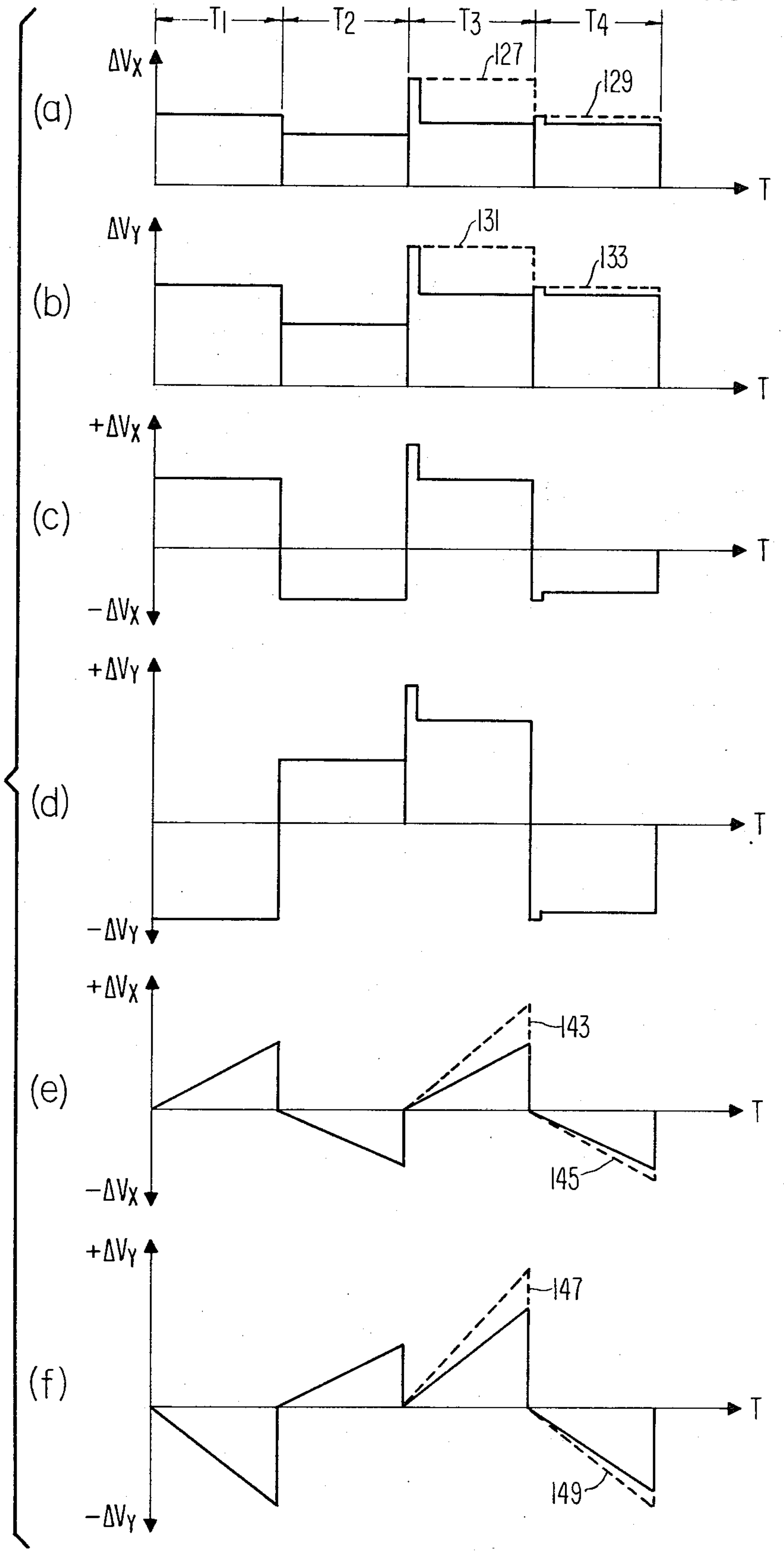
FIG. 4 is a diagram of selected idealized waveforms at points A through F in the vector generator of FIG. 1.

Signals A and B of FIG. 4, at time $T_3$, are fed to signal sign circuits 13 and 19, respectively. Since there were no sign change signals on sign change lines 40 and 50, no polarity reversals occur. Integrators 15 and 21, respectively, integrate the modified waveform as shown in FIGS. 4C and 4D at $T_3$ to produce the ramp function shown in FIGS. 4E and 4F at $T_3$. The dashed lines of FIGS. 4E and 4F at time $T_3$ illustrate what the ramp function would have looked like if the feedback circuit had not been operating. The ramp function actually generated is illustrated in solid lines in FIGS. 4E and 4F. These ramp functions generate a vector display, $T_3$, as shown in solid lines in FIG. 5. The extension of vector $T_3$ by adding dashed line 151 to the solid stroke, illustrates the length of the vector that would have been generated if the feedback circuit had not been operating.

Let us assume now that in time period $T_4$ digital-to-analog converters 11 and 17 receive data words that represent a vector having a length slightly larger than the predetermined maximum length and the signal generated by the digital-to-analog converters have the amplitude shown in FIGS. 4A and 4B, at time period $T_4$. The solid lines of the figure illustrate a wave shape that would cause the deflection circuitry of the invention to generate a vector having the maximum length, but the D/A converters begin generating a signal having a slightly higher amplitude, as illustrated by dashed lines 129 and 133. The octagon generator will operate on the two signals as previously explained. The output on line 59 will be summed with the voltage reference supply 27. This sum will be inverted and amplified by inversion amplifier 25 and its output compared with the output from voltage level selector 29 by comparator amplifier 31. Because the output of the digital-to-analog converters is larger than the level for which the reference voltage supply 27 and voltage level selector 29 was set for, the result of a summation of the output of the octagon generator and the negative voltage supply will create a smaller than usual signal on line 63. Therefore, comparator amplifier 31 will cause transistor switch 35 to turn on or stay on and transistor switch 33 to turn off or stay off. The signal on line 63 is thus fed to both digital-to-analog converters 11 and 17 over lines 67 and 68, respectively. This will result in the digital-to-analog converters having outputs as shown by a solid line in FIGS. 4A and 4B at time $T_4$.

This wave is supplied to the signal sign circuits 13 and 19, respectively. Assuming that both signal sign circuits receive a sign change signal, the outputs of these circuits will be as shown in FIGS. 4C and 4D at time $T_4$. These outputs will be supplied to integrator 15 and integrator 21 which will generate the functions shown in FIGS. 4E and 4F at time $T_4$. The solid lines of FIGS. 4E and 4F represent the functions generated, while the dashed lines 145 and 149, respectively, indicate the ramp that would have been generated if the feedback circuit of this voltage generator had not been functioning. The vector traced on the screen in response to the ramp signal of FIGS. 4E and 4F at time $T_4$ is shown as vector $T_4$, the actual length of the vector being represented by a solid line, the dashed segment of 53, when added to the solid line, representing the length that would have been traced if the feedback circuit of the invention had not been functioning.

In summary, it can be seen that whenever digital data words are received that instruct the vector generator to generate vectors greater than the length for which it is set, by adjustment to reference voltage source 27, the feedback circuit of the control circuit of the invention will cause the actual vector traced on the CRT screen to be no greater than that maximum length. When digital-to-analog converters 11 and 17 receive digital data words that indicate a vector having a length less than the predetermined maximum length vector is to be generated, the feedback circuit is disconnected and one of a plurality of voltage levels is supplied to the D/A converters as a reference voltage, thereby allowing a vector shorter than the maximum length vector to be traced on the CRT screen. Use of an intensity control circuit, such as a Z-axis amplifier driven by the octagon generator in the feedback circuit insures that these shorter vectors are displayed at the same intensity as the longer vectors.

It should be understood, of course, that the foregoing disclosure relates only to the preferred embodiment of the invention and that numerous modifications or alterations may be made therein without departing from the spirit and the scope of the invention as set forth in the appended claims.

What is claimed is:

1. In a vector generator having X and Y axis deflection circuits responsive to signals from D/A converters individual to each deflection circuit, a control circuit for predetermining the maximum length vector to be generated, comprising:

means responsive to the signals from both D/A converters for generating a resultant signal;

means for converting said resultant signal into a vector length stabilizing reference signal for said D/A converters;

means for generating an independent D/A converter reference signal for permitting vector lengths shorter than said maximum length vector to be generated; and means for automatically substituting said independent reference signal for said stabilizing reference signal when, and as long as, the magnitude of the stabilizing reference signal is greater than the magnitude of the independent reference signal.

2. The vector generator of claim 1 wherein said means for generating a resultant signal comprises:

an octagon generator responsive to the output signals from said D/A converters.

3. The vector generator of claim 2 wherein said octagon generator comprises:

a first current path having a first resistor and a first diode in series; and a second current path having a second resistor and a second diode in series, said second resistor being equal in resistance value to said first resistor and having its free end connected to the end of said first resistor not connected to said first diode.

4. The vector generator of claim 1 wherein said vector length stabilizing means comprises:

a negative voltage supply having an adjustable output;

means for summing the resultant signal with the adjustable output from said negative voltage supply; and means for inverting and amplifying the output of said summing means.

5. The vector generator of claim 1 wherein said means for generating an independent reference signal comprises:

a plurality of parallel interconnected resistance legs connected to a voltage source; and means connected to each of said plurality of legs for connecting or disconnecting the resistance in a respective leg to the other resistance legs.

6. The vector generator of claim 1 wherein said substituting means comprises:

a voltage comparison amplifier responsive to the vector length stabilizing reference signals and the independent reference signal; and means responsive to the output of said comparison amplifier for preventing said stabilizing reference or said independent reference signal from proceeding to said D/A converters.

7. The vector generator of claim 6 wherein said preventing means comprises a pair of electronic switches, one connected into the stabilizing reference signal path to said D/A converters and one connected into the independent reference signal path to said D/A converters.

References Cited

UNITED STATES PATENTS

| | | | |
|---|---|---|---|
| 3,325,802 | 6/1967 | Bacon | 315—27 R |
| 3,537,098 | 10/1970 | Nielsen et al. | 315—22 |
| 3,544,835 | 12/1970 | Nielsen | 315—22 |
| 3,539,860 | 11/1970 | Max et al. | 315—22 |

CARL D. QUARFORTH, Primary Examiner

T. M. POTENZA, Assistant Examiner

U.S. Cl. X.R.

315—18